US008320869B2

(12) United States Patent
Van Den Elzen

(10) Patent No.: US 8,320,869 B2
(45) Date of Patent: Nov. 27, 2012

(54) ANTENNA ARRANGEMENT WITH REDUCED COMM-MODE SIGNALS

(75) Inventor: Jan Johannes Maria Van Den Elzen, Gemert (NL)

(73) Assignee: Tomtom International B.V., Amsterdam (NL)

( * ) Notice: Subject to any disclaimer, the term of this patent is extended or adjusted under 35 U.S.C. 154(b) by 161 days.

(21) Appl. No.: 12/734,251

(22) PCT Filed: Oct. 22, 2008

(86) PCT No.: PCT/EP2008/064316

§ 371 (c)(1), (2), (4) Date: May 12, 2010

(87) PCT Pub. No.: WO2009/053404

PCT Pub. Date: Apr. 30, 2009

(65) Prior Publication Data

US 2010/0297972 A1 Nov. 25, 2010

Related U.S. Application Data

(60) Provisional application No. 60/960,991, filed on Oct. 24, 2007.

(51) Int. Cl.
*H04B 1/10* (2006.01)

(52) U.S. Cl. .................................... 455/307; 455/562.1

(58) Field of Classification Search ............... 455/575.7, 455/562.1; 343/793
See application file for complete search history.

(56) References Cited

U.S. PATENT DOCUMENTS

| | | | | |
|---|---|---|---|---|
| 4,217,589 | A | 8/1980 | Stahler | |
| 5,476,394 | A | 12/1995 | Sugihara et al. | |
| 5,673,088 | A * | 9/1997 | Nah | 455/575.7 |
| 6,384,705 | B1 * | 5/2002 | Huang et al. | 336/200 |
| 8,180,392 | B2 * | 5/2012 | Sekiya et al. | 342/159 |
| 2004/0046557 | A1 * | 3/2004 | Karmarkar et al. | 324/322 |
| 2006/0117834 | A1 * | 6/2006 | Goto | 455/562.1 |

FOREIGN PATENT DOCUMENTS

| | | | |
|---|---|---|---|
| DE | 1 943 890 | | 3/1971 |
| DE | 34 05 044 | | 8/1985 |
| DE | 3405044 | * | 8/1985 |
| DE | 35 04 719 | | 8/1986 |
| DE | 103 22 186 | | 12/2004 |
| DE | 1672787 | * | 8/2008 |
| EP | 1 672 787 | | 8/2008 |

OTHER PUBLICATIONS

International Search Report, Mar. 2009.

* cited by examiner

*Primary Examiner* — Lana N Le

(57) ABSTRACT

In one embodiment of the present invention, an antenna arrangement apparatus includes a dipole reception antenna including a first pole portion and a second pole portion. A length of coaxial cable is provided and constitutes a feedline, the length of coaxial cable including a proximal end with respect to the first and second pole portions. The proximal end of the length of coaxial cable is coupled to the first and second pole portions via a common-mode filter.

19 Claims, 4 Drawing Sheets

ANTENNA ARRANGEMENT WITH REDUCED COMM-MODE SIGNALS

This application is a National Phase entry of PCT Application number PCT/EP2008/064316 filed on Oct. 22, 2008, which claims priority under 35 U.S.C. §119(e), 120 and 365 (c) to U.S. Provisional Application No. 60/960,991, filed on Oct. 24, 2007.

FIELD OF THE INVENTION

The present invention relates to an antenna arrangement apparatus of the type that, for example, is used to receive Radio Frequency signals for an electronic device, for example a navigation device or a communications device. The present invention also relates to a receiver apparatus of the type that, for example, is used to receive the Radio Frequency signals for an electronic device, for example a navigation device or a communications device. The present invention further relates to a method of reducing a common-mode signal, the method being of the type that, for example, is used to receive a Radio Frequency signal in the presence of a common-mode current generated by an external source.

BACKGROUND TO THE INVENTION

Portable computing devices, for example Portable Navigation Devices (PNDs), which include GPS (Global Positioning System) signal reception and processing functionality are well known and are widely employed as in-car or other vehicle navigation systems.

In general terms, a modern PND comprises a processor, memory, and map data stored within said memory. The processor and memory cooperate to provide an execution environment in which a software operating system can be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include: a visual display and a speaker for audible output. Illustrative examples of input interfaces include: one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of a touch sensitive overlay or otherwise) additionally to provide an input interface by means of which a user can operate the device through the display.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant), a media player, a mobile phone or the like, and in these cases, the normal functionality of the hand-held system is extended by means of the installation of software on the device to perform both route calculation and navigation along a calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information can be displayed, optionally in a status bar above, below or to one side of the displayed map information, an example of the navigation information includes a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally or alternately by steering column mounted remote control, by voice activation or by any other suitable method.

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems, for example a Radio Data System (RDS)-Traffic Message Channel (TMC) service.

Whilst it is known for the device to perform route re-calculation in the event that a user deviates from the previously calculated route during navigation (either by accident or intentionally), a further important function provided by the device is automatic route re-calculation in the event that real-time traffic conditions dictate that an alternative route would be more expedient. The device is suitably enabled to recognize such conditions automatically, or if a user actively causes the device to perform route re-calculation for any reason.

It is also known to allow a route to be calculated with user defined criteria for example, the user may wish to avoid any roads on which traffic congestion is likely, expected or currently prevailing. The device software would then calculate various routes using stored information indicative of prevailing traffic conditions on particular roads, and order the calculated routes in terms of level of likely congestion or delay on account thereof. Other traffic information-based route calculation and navigation criteria are also possible.

Hence, it can be seen that traffic related information is of particular use when calculating routes and directing a user to a location. In this respect, and as mentioned above, it is known to broadcast traffic-related information using the RDS-TMC facility supported by some broadcasters. In the UK, for example, one known traffic-related information service is broadcast using the frequencies allocated to the station known as "Classic fm". The skilled person should, of course, appreciate that different frequencies are used by different traffic-related information service providers.

A PND, provided with an RDS-TMC receiver for receiving RDS data broadcast, can decode the RDS data broadcast and extract TMC data included in the RDS data broadcast. Such Frequency Modulation (FM) receivers need to be sensitive. For many PNDs currently sold, an accessory is provided comprising an RDS-TMC tuner coupled to an antenna at one end and a connector at another end thereof for coupling the RDS-TMC receiver to an input of the PND.

Devices of the type described above, for example the 920 GO model manufactured and supplied by TomTom International which employ the above-described antenna, support a process of enabling users to navigate from one position to another, in particular using traffic-related information. Such devices are of great utility when the user is not familiar with the route to the destination to which they are navigating.

However, the effectiveness of such devices can sometimes depend upon the antenna structure employed. In this respect, in the field of antenna design, a number of antenna structures are known to have varying degrees of suitability in relation to receipt of RDS-TMC data. One antenna structure is a so-called dipole antenna structure, having numerous variants thereof, for example a symmetric dipole antenna structure and an asymmetric dipole antenna structure. Wired variants of the symmetric and asymmetric dipole antenna structures comprise a pair of wires, for example flexible wires, constituting a first pole and a second pole. The symmetric antenna structure was originally designed for symmetric Radio-Frequency (RF) input circuits, the symmetric antenna structure simply comprising symmetric twin cables that were connected to an RF receiver. An RF transformer was provided in the RF receiver in order to convert a symmetric antenna signal to an asymmetric antenna signal that could be amplified by a suitable RF amplifier circuit in the RF receiver. Over time, as this technology was developed, a so-called "feedline" was introduced into the design of the antenna for high frequency and/or weak signal applications in order to distance the antenna poles from "noisy" electrical circuitry to which the antenna structure was to be coupled. One type of feedline employed was in the form of a length of coaxial cable. However, the coaxial cable is a transmission line having conductors of unequal impedances with respect to ground potential and so is considered "unbalanced". In order to match the symmetric impedances (balanced) of the pole wires with the asymmetric impedances of the feedline, it is known to place a so-called "balun" in-line between the pole wires and the feedline, thereby matching the impedances of the pole wires and the feedline and so mitigating unwanted common-mode currents from flowing in the feedline that can cause the pole wires to radiate RF energy.

Unfortunately, despite the distancing of the poles provided by the coaxial feedline, the antenna structure comprising the pole wires and the coaxial feedline of the type described above is still susceptible to Electromagnetic Interference (EMI) from neighbouring electrical and/or electronic devices, for example the PND and/or a power supply, for example a Cigarette Lighter Adaptor (CLA). In this respect, unlike electronic systems integrated into a vehicle, for example an automobile, the PND is "floating" with respect to ground at radio frequencies and so received signals are not referenced to an "EMI clean" body of the vehicle, but to a "noisy" ground reference of the PND instead. Furthermore, it is undesirable, from the perspective of a manufacturer of a PND, to require a user of the PND to connect an antenna to the body of the vehicle in order to obtain the desired "clean" ground reference. Even if the distance provided by the coaxial feedline is taken into account, the antenna is nevertheless still positioned very close to the EMI "noisy" PND. Consequently, antenna performance can, in some circumstances, be inadequate resulting in the PND not receiving any data or only partial data. From the perspective of a user of the PND, the user simply perceives that no or incomplete traffic information is available and can wrongly conclude that the PND and/or the TMC accessory are/is malfunctioning.

European patent publication no. EP 1 672 787 relates to a broadcast receiver having an antenna socket coupled to a common mode input filter of a radio tuner via a feeder line. However, the input filter requires a ground, which is provided by the radio tuner. An interference-free analogue to the ground is not, unfortunately, available in the context of the RDS-TMC tuner and antenna.

Other solutions to reduce influence of externally interfering sources of RF signals are known. For example, external sources capable of emitting electromagnetic radiation can be shielded in respect of certain frequency ranges. However, such solutions are expensive and can result in other problems relating to, for example, heat dissipation. Additionally, when circuit designs change, provisions made for electromagnetic shielding can require modification too. Hence, design and implementation costs and lack of re-usability of an electromagnetic radiation shielding solution makes electromagnetic shielding of the external sources of electromagnetic radiations undesirable.

Due to the presence of the above-described unwanted EMI, a combination of a desired RF signal and an unwanted EMI signal is received at an input of an RF receiver. Whilst it is possible to increase sensitivity of the RF receiver, increased sensitivity does not serve to increase a Signal-to-Noise Ratio (SNR) of the RF receiver and hence the process of discriminating the wanted signal from the unwanted signal.

SUMMARY OF THE INVENTION

According to a first aspect of the present invention, there is provided an antenna arrangement apparatus comprising: a dipole reception antenna having a first pole portion and a second pole portion; a length of coaxial cable constituting a feedline; and a common-mode filter; wherein the length of coaxial cable has a proximal end with respect to the first and second pole portions, the proximal end being coupled to the first and second pole portions via the common-mode filter.

A length of the first pole portion may correspond to about a quarter of a predetermined wavelength for a Radio-Frequency (RF) signal to be received. A length of the second pole portion may correspond to between about a third of a predetermined wavelength and about a quarter of the predetermined wavelength for a Radio-Frequency (RF) signal to be received.

The apparatus may further comprise a first length of uniaxial electrical conductor serving as the first pole portion.

The apparatus may further comprise a second length of uniaxial electrical conductor serving as the second pole portion.

The first and second pole portions may be arranged to form a symmetric dipole reception antenna. The first and second pole portions may be arranged to form an asymmetric dipole reception antenna.

The first pole portion may be between about 50 cm and about 75 cm in length. The second pole portion may be between about 50 cm and about 75 cm in length.

The common-mode filter may have a common-mode impedance of between about 1000Ω and about 4000Ω. The common-mode filter may have a common mode impedance of about 2200Ω.

The apparatus may further comprise an amplifier coupled in line between the proximal end of the length of coaxial cable and the first and second pole portions. The amplifier may be coupled between the common-mode filter and the first and second pole portions. The amplifier may be coupled between the proximal end of the length of coaxial cable and the common-mode filter.

According to a second aspect of the present invention, there is provided a reception apparatus comprising: the antenna arrangement apparatus as set forth above in relation to the first aspect of the invention; and a tuner coupled to a distal end of the length of coaxial cable.

The tuner may be a Frequency Modulation (FM) tuner. The tuner may be a Radio Data System (RDS)-Traffic Message Channel (TMC) tuner.

The apparatus may further comprise a coupling cable for communicating data decoded by the tuner to a device.

According to a third aspect of the present invention, there is provided a portable navigation device comprising the antenna arrangement apparatus or the reception apparatus as set forth above in relation to the first or second aspects of the invention, respectively.

According to a fourth aspect of the present invention, there is provided a method of reducing a common-mode signal in respect of an antenna arrangement apparatus, the method comprising: providing a dipole antenna having a first pole portion and a second pole portion providing a length of coaxial cable having a proximal end with respect to the first and second pole portion; and coupling the proximal end of the length of coaxial cable to the first and second pole portions via a common-mode filter.

Advantages of these embodiments are set out hereafter, and further details and features of each of these embodiments are defined in the accompanying dependent claims and elsewhere in the following detailed description.

It is thus possible to provide an apparatus and method that are less susceptible to common-mode signals. Improved signal reception is thus possible, thereby resulting in improved reception of information, for example traffic-related information, such as RDS-TMC data. The structure of the antenna is also simple and economic to manufacture. The use of the common-mode filter isolates the dipoles of the antenna from common-mode signals induced in the feedline between a tuner and the dipoles of the antenna. Improved isolation of the dipoles of the antenna from other common-mode signals, for example those resulting from parasitic capacitances of the device to which the apparatus can be coupled, or from power sources, can be achieved. Furthermore, a galvanic connection between the antenna and a chassis of a vehicle is not necessary. Also, the shielding of the coaxial cable of the feedline is not part of the antenna structure and so is insensitive to EMI. The feedline therefore increases distance between sources of EMI and the antenna structure. Consequently, improved flexibility in respect of mounting the apparatus is provided, including the ability to wind the coaxial feedline, if desired. Additionally, the apparatus and method are not necessarily application specific and so provide a flexible solution for different RF reception applications. The improved performance provided by the method and apparatus also reduces instances of user annoyance and false enquires made to manufacturers, distributors and/or retailers concerning whether or not the apparatus is faulty.

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

Figure 1:
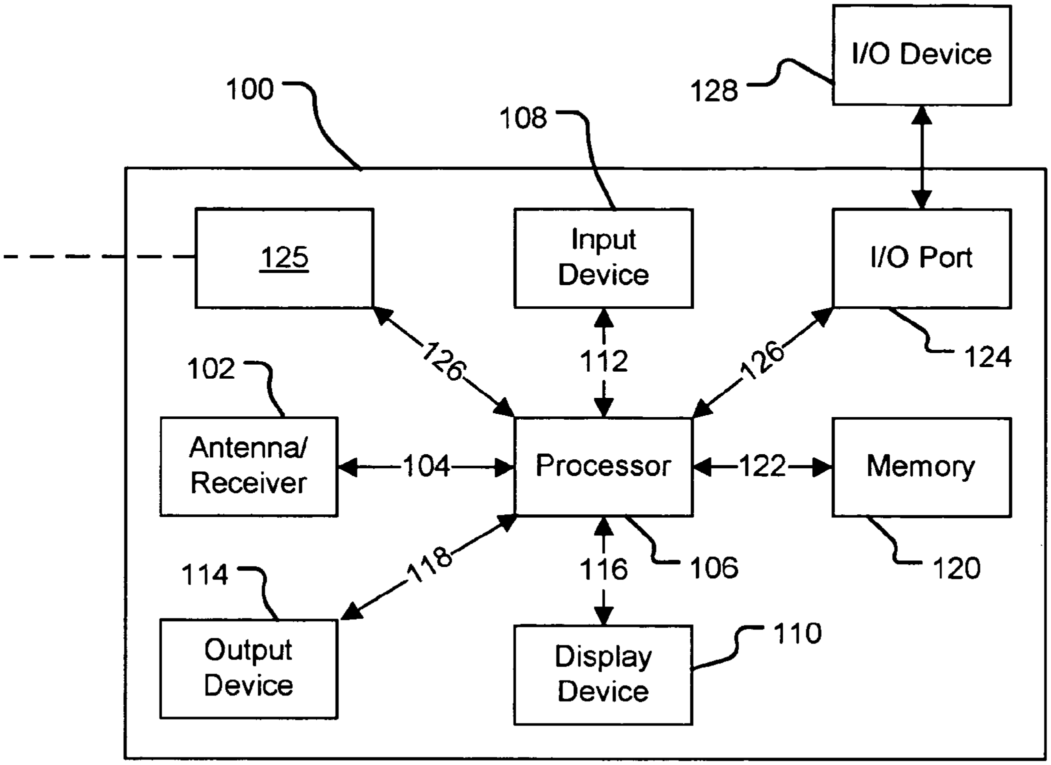
FIG. 1 is a schematic illustration of components of a navigation device.

Throughout the following description identical reference numerals will be used to identify like parts.

Embodiments of the present invention will now be described with particular reference to a PND. It should be remembered, however, that the teachings of the present invention are not limited to PNDs but are instead universally applicable to any type of processing device, for example but not limited to those that are configured to execute navigation software in a portable or mobile manner so as to provide route planning and navigation functionality. It follows therefore that in the context of the present application, a navigation device is intended to include (without limitation) any type of route planning and navigation device, irrespective of whether that device is embodied as a PND, a vehicle such as an automobile, or indeed a portable computing resource, for example a portable personal computer (PC), a mobile telephone or a Personal Digital Assistant (PDA) executing route planning and navigation software.

It will also be apparent from the following that the teachings of the present invention even have utility in circumstances where a user is not seeking instructions on how to navigate from one point to another, but merely wishes to be provided with information concerning, for example, traffic. In such circumstances, the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Referring to FIG. 1, a navigation device 100 is located within a housing (not shown). The navigation device 100 comprises or is coupled to a GPS receiver device 102 via a connection 104, wherein the GPS receiver device 102 can be, for example, a GPS antenna/receiver. It should be understood that the antenna and receiver designated by reference numeral 102 are combined schematically for illustration, but that the antenna and receiver may be separately located components, and that the antenna may be a GPS patch antenna or helical antenna for example.

The navigation device 100 includes a processing resource comprising, for example, a processor 106, the processor 106 being coupled to an input device 108 and a display device, for example a display screen 110. Although reference is made here to the input device 108 in the singular, the skilled person should appreciate that the input device 108 represents any number of input devices, including a keyboard device, voice input device, touch panel and/or any other known input device utilised to input information. Likewise, the display screen 110 can include any type of display screen for example a Liquid Crystal Display (LCD).

In one arrangement, one aspect of the input device 108, the touch panel, and the display screen 110 are integrated so as to provide an integrated input and display device, including a touchpad or touchscreen input to enable both input of information (via direct input, menu selection, etc.) and display of information through the touch panel screen so that a user need only touch a portion of the display screen 110 to select one of a plurality of display choices or to activate one of a plurality of virtual or "soft" buttons. In this respect, the processor 106 supports a Graphical User Interface (GUI) that operates in conjunction with the touchscreen.

In the navigation device 100, the processor 106 is operatively connected to and capable of receiving input information from input device 108 via a connection 112, and operatively connected to at least one of the display screen 110 and an output device 114, for example an audible output device (e.g. a loudspeaker), via respective output connections 116, 118. As the output device 114 can produce audible information for a user of the navigation device 100, it should equally be understood that, as suggested above, the input device 108 can include a microphone and software for receiving input voice commands. Further, the navigation device 100 can also include any additional input device 108 and/or any additional output device, for example audio input/output devices.

The processor 106 is operatively connected to a memory resource 120 comprising, for example a Random Access Memory (RAM) and a digital memory, such as a flash memory, via connection 122 and is further arranged to receive/send information from/to input/output (I/O) port 124 via connection 126, wherein the I/O port 124 is connectable to an I/O device 128 external to the navigation device 100.

The external I/O device 128 may include, but is not limited to, an external listening device, such as an earpiece for example. The connection to the I/O device 128 can further be a wired or wireless connection to any other external device, for example a car stereo unit for hands-free operation and/or for voice activated operation, for connection to an earpiece or headphones, and/or for connection to a mobile telephone, the mobile telephone connection can be used to establish a data connection between the navigation device 100 and the Internet or any other network for example, and/or to establish a connection to a server via the Internet or some other network for example.

The navigation device 100 is capable of establishing a data session, if required, with network hardware of a "mobile" or telecommunications network via a mobile device (not shown), for example the mobile telephone described above, a PDA and/or any device with mobile telephone technology, in order to establish a digital connection, for example a digital connection via known Bluetooth technology. Thereafter, through its network service provider; the mobile device can establish a network connection (through the Internet for example) with the server (not shown). As such, a "mobile" network connection can be established between the navigation device 100 (which can be, and oftentimes is, mobile as it travels alone and/or in a vehicle) and the server to provide a "real-time" or at least very "up to date" gateway for information.

In this example, the navigation device 100 also comprises an input port 125 operatively coupled to the processor 106 for receipt of traffic-related data.

It will, of course, be understood by one of ordinary skill in the art that the electronic units schematically shown in FIG. 1 are powered by one or more power sources (not shown) in a conventional manner. As will also be understood by one of ordinary skill in the art, different configurations of the units shown in FIG. 1 are contemplated. For example, the components shown in FIG. 1 may be in communication with one another via wired and/or wireless connections and the like. Thus, the navigation device 100 described herein can be a portable or handheld navigation device 100.

It should also be noted that the block diagram of the navigation device 100 described above is not inclusive of all components of the navigation device 100, but is only representative of many example components.

Figure 2:
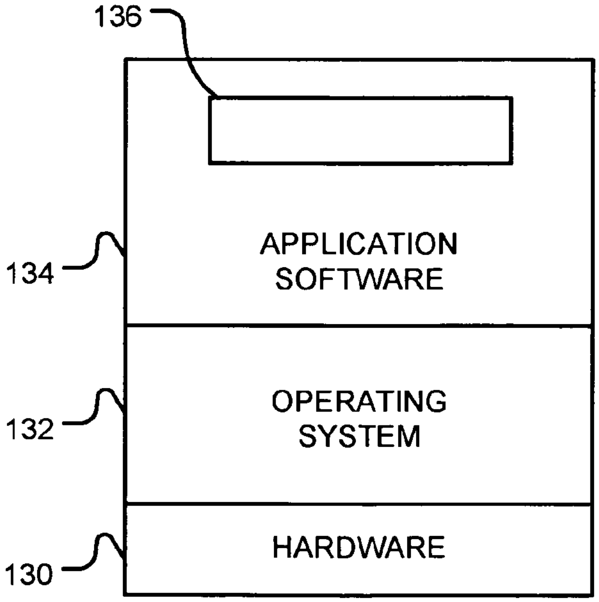
FIG. 2 is a schematic representation of an architectural stack employed by the navigation device of FIG. 1.

Turning to FIG. 2, the memory resource 120 stores a boot loader that is executed by the processor 106 in order to load an operating system 132 from the memory resource 120 for execution by functional hardware components 130, which provides an environment in which application software 134 (implementing some or all of the above described route planning and navigation functionality) can run. The application software 134 provides an operational environment including the GUI that supports core functions of the navigation device 100, for example map viewing, route planning, navigation functions and any other functions associated therewith. In this example, part of the application software 134 comprises a traffic data processing module 136 that receives and processes traffic-related data and provides the user with traffic information integrated with map information. As such functionality is not, by itself, core to the embodiments described herein, no further details of the traffic data processing module 136 will be described herein for the sake of conciseness and clarity of description.

Figure 3:
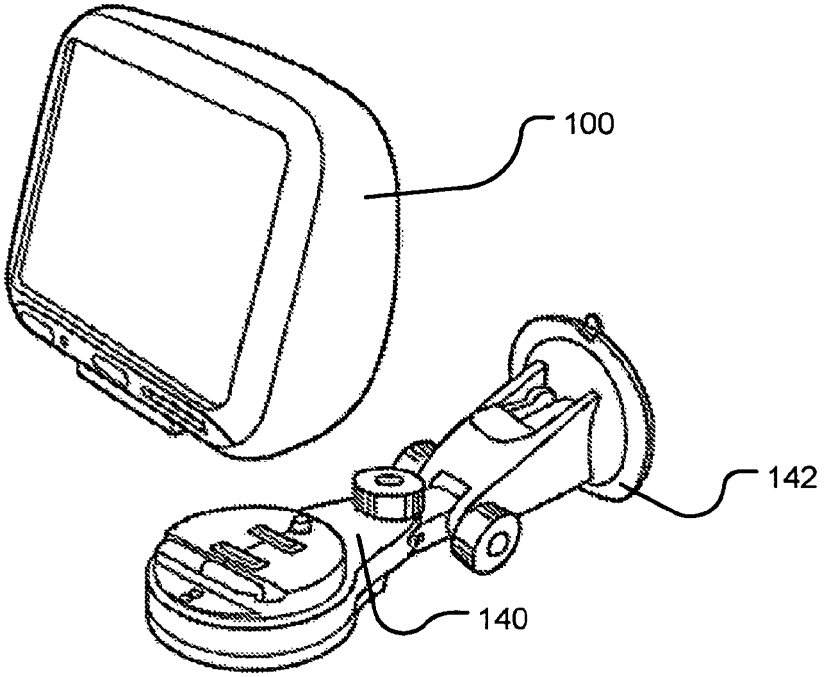
FIG. 3 is a schematic diagram of an arrangement for mounting and/or docking the navigation device of FIG. 1.

Referring to FIG. 3, the navigation device 100 is, in this example, capable of coupling to an arm 140, the arm being capable of being secured to, for example, a vehicle dashboard or window using a suction cup 142. The arm 140 is one example of a docking station with which the navigation device 100 can be docked. The navigation device 100 can be docked with, or otherwise connected to, the docking station 140 by snap connecting the navigation device 100 to the arm 140, for example. The navigation device 100 can also be rotatable on the arm 140. To release a connection between the navigation device 100 and the docking station 140, a button on the navigation device 100 is provided and can be pressed. Other equally suitable arrangements for coupling and decoupling the navigation device 100 to a docking station can alternatively be provided.

Figure 4:
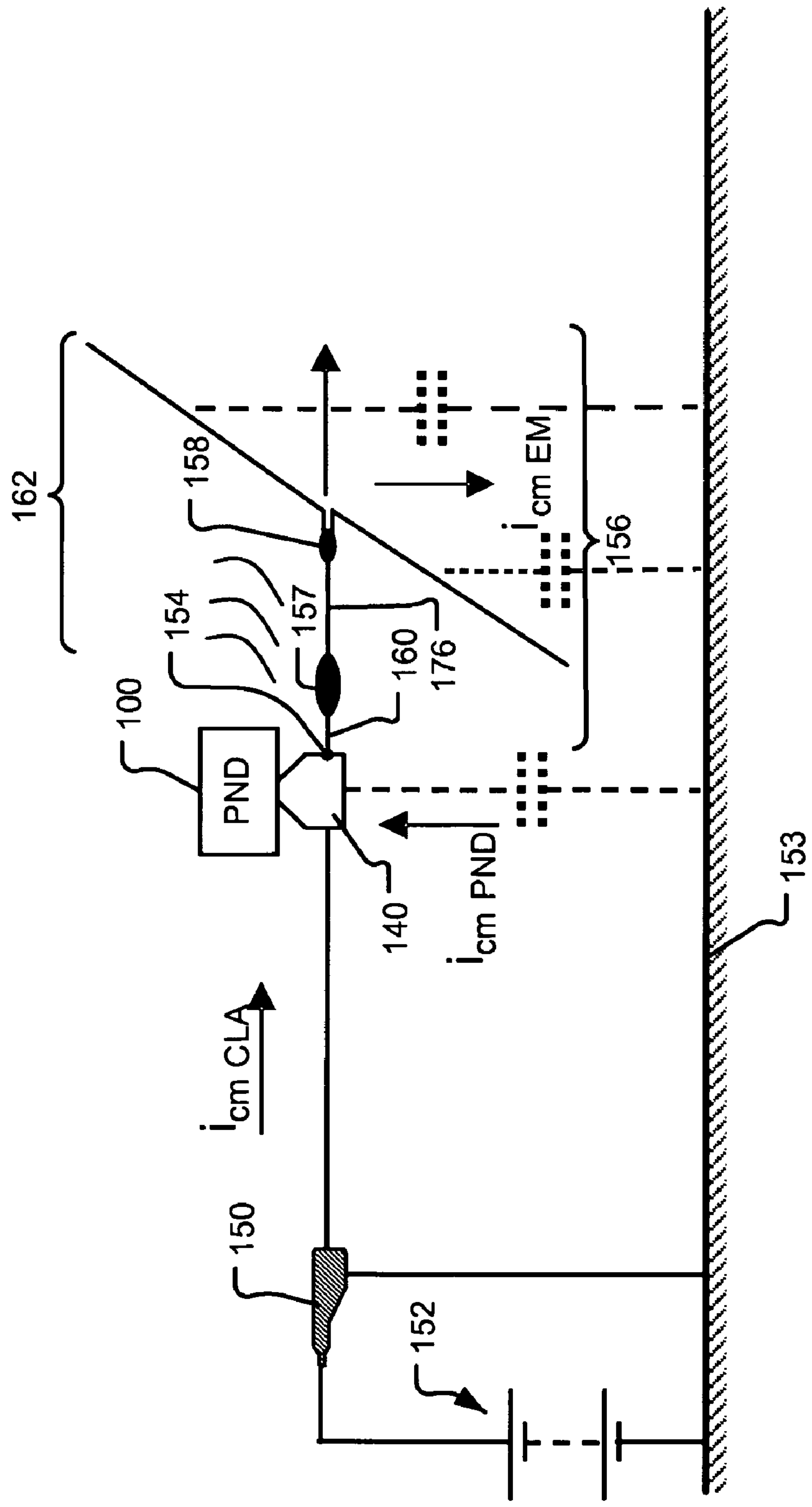
FIG. 4 is a schematic diagram of an antenna arrangement apparatus coupled to the navigation device of FIG. 1.
Figure 6:
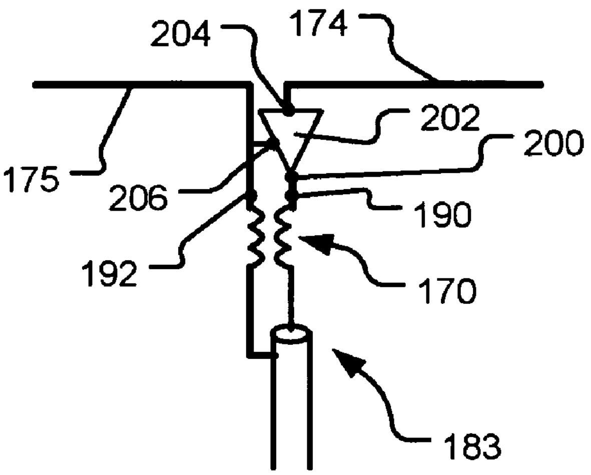
FIG. 6 is a schematic diagram of an alternative antenna arrangement apparatus to that employed in FIG. 4.
Figure 7:
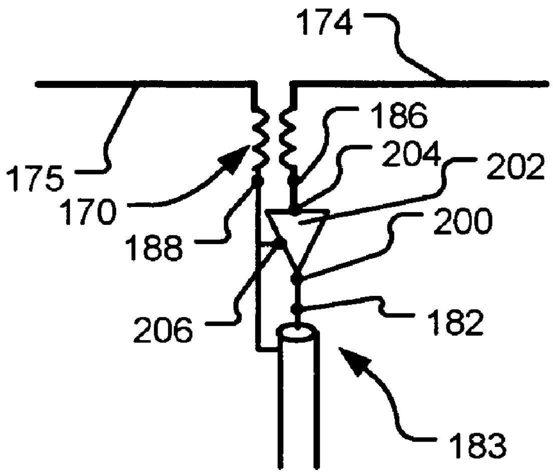
FIG. 7 is a schematic diagram of another alternative antenna arrangement apparatus to that of FIG. 6 and constituting another embodiment of the invention.

Turning to FIG. 4, the navigation device 100 is, in this example, located in a vehicle, for example an automobile, and connected to the docking station 140. The docking station 140 is coupled to a Cigarette Lighter Adaptor (CLA) 150, the CLA 150 being plugged into a so-called cigarette lighter (not shown) of the vehicle. The coupling of the CLA 150 to the cigarette lighter of the vehicle allowing a battery 152 of the vehicle to be used to power the navigation device 100, in this example via the docking station 140, after appropriate conversion of the 12V Direct Current (DC) supply provided by the battery 152. Both the battery 152 and the CLA 150 are coupled to a ground 153 provided by the vehicle, typically the chassis or body of the vehicle.

The docking station 140 comprises an input port 154 that is coupled to the input port 125 of the navigation device 100 when the navigation device 100 is docked. A reception apparatus 156 is coupled to the docking station 140. In this respect, the reception apparatus 156 comprises a coupling connector (not shown), for example a jack plug or, for coupling to the input port 154, the connector being coupled to a tuner (not shown in FIG. 4), located in a first housing 157, via a coupling cable 160. Of course, if the docking station 140 is not employed, the coupling connector can be directly connected to the input port 125 of the navigation device 100.

The tuner inside the first housing 157 is, in this example, a Frequency Modulation (FM) receiver, particularly an RDS-TMC tuner. By way of example, a suitable receiver is available from GNS GmbH, Germany. In addition to the tuner, the reception apparatus 156 also comprises an antenna arrangement apparatus 162, the tuner being coupled to the antenna arrangement apparatus 162.

Figure 5:
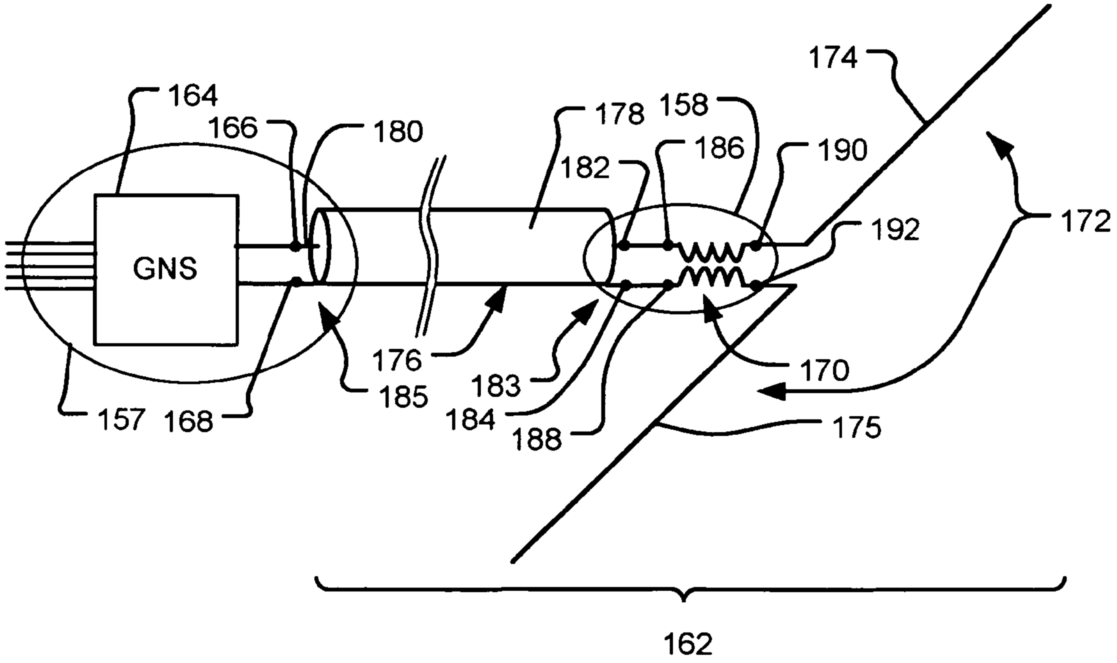
FIG. 5 is a schematic diagram of the antenna arrangement apparatus of FIG. 4 in greater detail and constituting an embodiment of the invention.

Referring to FIG. 5, the housing 157 comprises the tuner 164, the tuner 164 being coupled to a first terminal 166 of a core 180 of a length of coaxial cable 176, the length of coaxial cable 176 serving as a feedline. The length of coaxial cable 176 has a proximal end 183 and a distal end 185 relative to antenna poles to be described later herein. The tuner 164 is also coupled to a first terminal 168 of a shield 178 of the length of coaxial cable 176.

At the proximal end 183 of the length of coaxial cable 176, a second terminal 182 of the core 180 of the length of coaxial cable 176 and a second terminal 184 of the shield 178 of the length of the coaxial cable 176 are coupled to a first terminal 186 and a second terminal 188 of a filter 170, respectively. The filter 170 is a common-mode filter, for example a common-mode transformer, such as a coil, or a toroidal inductor or a common-mode choke, for example a bifilar choke. As mentioned above, the filter 170 is located in the second housing 158 and has a common-mode impedance and a differential-mode impedance. The common-mode impedance of the filter can be at least about 1 kΩ. The common-mode impedance can be between about 1 kΩ and about 4 kΩ, for example between about 1.5 kΩ and about 2.5 kΩ, such as between about 2 kΩ and about 2.3 kΩ. In this example, the filter 170 has a common-mode impedance of about 2.2 kΩ. This is considerably in excess of an inherent common-mode impedance of a length of cable. The differential-mode impedance of the filter 170 can be between about 1Ω and about 50Ω, for example, between about 1Ω and about 20Ω, such as between about 5Ω and about 15Ω. In this example, the differential-mode impedance of the filter 170 is about 10Ω.

The antenna arrangement apparatus 162 comprises the common-mode filter 170 and a dipole reception antenna 172. The dipole antenna 172 comprises a first pole portion 174 formed from a first length of conductor, for example a uniaxial conductor, and a second pole portion 175 formed from a second length of conductor, for example another uniaxial conductor. A third terminal 190 of the filter 170 is coupled to one end of the first pole portion 174 and a fourth terminal 192 of the filter 170 is coupled to one end of the second pole portion 175. In use, the poles of the dipole antenna 172 are arranged by a user to extend substantially or approximately away from each other to ensure proper operation of the antenna arrangement apparatus 162.

A first length of the first pole 174 corresponds to a quarter of a wavelength ($\lambda/4$) of a signal the receipt of which is desired, for example a broadcast signal, such as an FM signal comprising RDS-TMC data. Consequently, in this example, the length of the first pole portion 174 is about 75 cm. Similarly, a second length of the second pole 175 corresponds to a quarter of a wavelength ($\lambda/4$) of the signal the receipt of which is desired. Consequently, in this example, the dipole antenna 172 is symmetric, the length of the second pole portion 175 being also about 75 cm.

In another embodiment, the dipole antenna 172 is asymmetric. The first length of the first pole portion 174 also corresponds to a third of the wavelength ($\lambda/3$) of the signal the receipt of which is desired, for example the broadcast signal, such as the FM signal comprising RDS-TMC data. Consequently, in this example, the length of the first pole portion 174 is again about 75 cm. However, the second length of the second pole portion 175 corresponds to a third of a wavelength ($\lambda/3$) of the signal the receipt of which is desired. Consequently, in this example, the length of the second pole portion 175 is about 50 cm. The length of the first and second poles 174, 175 can correspond to between about one third of the wavelength and about one quarter of the wavelength of the signal the receipt of which is desired and so the skilled person should appreciate that other dipole configurations are contemplated that are not described herein. In the examples described above, the pole portions are approximately equal in length.

In any of the above embodiments, an amplifier or amplifier circuit can be provided in-line between the proximal end 183 of the length of coaxial cable 176 and the first and second pole portions 174, 175. The antenna arrangement apparatus 162 is therefore “active”. In one embodiment, the amplifier can be coupled between the common-mode filter 170 and the first and second pole portions 174, 175. In this respect, the third terminal 190 of the common-mode filter 170 is coupled to an output 200 of an RF amplifier circuit 202 and an input 204 of the RF amplifier 202 is coupled to the first pole portion 174. A ground terminal 206 of the RF amplifier 202 is coupled to the fourth terminal 192 of the common-mode filter 170 and the second pole portion 175.

In another embodiment, the amplifier is coupled between the common-mode filter 170 and the proximal end 183 of the length of coaxial cable 176. In this respect, the second terminal 182 of the core 180 of the length of coaxial cable 176 is coupled to the output 200 of the RF amplifier 202, the input 204 of the RF amplifier 202 being coupled to the first terminal 186 of the common-mode filter 170 and hence to the first pole portion 174 via the filter 170. The ground terminal 206 of the RF amplifier 202 is coupled to the shield 178 of the length of coaxial cable 176 and the second terminal 188 of the common-mode filter 170 and hence to the second pole portion 175 via the filter 170.

Of course, it should be appreciated that, in the examples set forth above, the RF amplifier circuit 202 can be any suitable RF amplifier, for example a Low Noise Amplifier (LNA), such as an RF transistor available from Infineon Technologies AG (for example part number: BFR 93) or NXP Semiconductors. Where the RF amplifier is employed, the length of the first pole portion 174 and/or the second pole portion can be shortened to, for example, less than about 50 cm, for example less than 20 cm, such as between about 15 cm and about 20 cm. In order to compensate for capacitive effects resulting from use of shorter pole portions, a compensatory inductance, for example a coil, such as a coil of 1 μH, can be provided, in-line, between the third terminal 190 of the filter 170 and the first pole portion 174 or the fourth terminal 192 of the filter 170 and the second pole portion 175. The inductance value of the compensatory inductance can be between about 250 nH and about 1.25 μH depending upon the respective lengths of the pole portions and associated structures.

Referring back to FIG. 4, in operation, a first common-mode interference current component, $i_{cm\ CLA}$, flows from the CLA 150 to the docking station 140 and hence the navigation device 100, the first common-mode interference current component, $i_{cm\ CLA}$, being generated by the CLA 150. A second common-mode interference current component, $i_{cm\ PND}$, flows into the coupling cable 160 as a result of a parasitic capacitance existing between the ground 153 and the navigation device 100. Indeed, the second common-mode interference current component, $i_{cm\ PND}$, flows into the coupling cable 160 irrespective of whether or not the CLA 150 is coupled to the cigarette lighter of the vehicle and/or present. Additionally, a third common mode current component, $i_{cm\ EM}$, is induced in the pole portions 174, 175 of the dipole antenna 172 by electromagnetic radiation emanating from the navigation device 100. The presence of the filter 170 serves to isolate the dipole reception antenna 172 from the above common-mode current components and so performance of the dipole reception antenna 172 is improved significantly, for example by about 20 dB.

Without the filter 170, the coupling cable 161 is a so-called “hot circuit” or is “EMC hot” and exhibits antenna-like behaviour. By provision of the filter 170, the distance at which conductors carry common-mode currents induced by electromagnetic radiation emissions, for example from the navigation device 100, is increased, namely the conductors of the dipole reception antenna 172 are the only conductors of the reception apparatus 156 into which common-mode currents can be induced by electromagnetic radiation emitted by the navigation device 100. Due to the distance of the dipole reception antenna 172 from the source of the electromagnetic radiation, namely the navigation device 100, and the attenuation of the power of the electromagnetic radiation with distance from the navigation device 100, the amount of induced common-mode current that flows in the dipole reception antenna 172 is minimised considerably.

A differential-mode current signal generated in the reception antenna 172 is therefore received, with reduced common-mode current components, by the receiver 164 and demodulated and decoded before communication to the navigation device 100, via the input port 125 thereof, for use by the traffic data processing module 136 of the application software 134. The differential-mode current is almost unaffected by the presence of the common-mode filter 170.

It should be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, although the above embodiments have been described in relation to reception of FM signals, particularly RDS-TMC signals, the skilled person should appreciate that the above embodiments can be used in respect of other applications, for example Digital Audio Broadcast (DAB) reception, such as Transport Protocol Experts Group (TPEG) data streams. Indeed, the skilled person should appreciate that the antenna arrangement apparatus 162 can be used to receive signals bearing audio information, for example FM audio signals. Consequently, the antenna arrangement apparatus can be used in connection with FM radio applications, for example FM radio applications used in relation to other electronic devices, such as communications devices. One suitable example is a mobile telephone handset comprising an integrated FM receiver or coupled to an FM receiver module.

It should be appreciated that whilst the antenna arrangement apparatus 162 has been described herein as having pole portions formed from flexible wire, the first and second pole portions can be formed in any other suitable manner, for example rigid metallic portions, such as so-called meander or fractal pole portions.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. An antenna arrangement apparatus comprising:

a dipole reception antenna having a first pole portion and a second pole portion;

a length of coaxial cable constituting a feedline; and a common-mode filter having a common-mode impendence of at least 1000Ω;

wherein the length of coaxial cable has a proximal end with respect to the first and second pole portions, a core of the proximal end being coupled to a first terminal of the common-mode filter and a shield of the proximal end being coupled to a second terminal of the common-mode filter; and wherein a third terminal of the common-mode filter is coupled to the first pole portion and a fourth terminal is coupled to the second pole portion.

2. An apparatus as claimed in claim 1, wherein a length of the first pole portion corresponds to between about a third of a wavelength and about a quarter of a wavelength for a Radio Frequency signal to be received.

3. An apparatus as claimed in claim 2, wherein the first pole portion is between about 50 cm and about 75 cm in length.

4. An apparatus as claimed in claim 1, wherein a length of the second pole portion corresponds to between about a third of a wavelength and about a quarter of the wavelength for a Radio-Frequency signal to be received.

5. An apparatus as claimed in claim 4, wherein the second pole portion is between about 50 cm and about 75 cm in length.

6. An apparatus as claimed in claim 1, further comprising a first length of uniaxial electrical conductor serving as the first pole portion.

7. An apparatus as claimed in claim 1, further comprising a second length of uniaxial electrical conductor serving as the second pole portion.

8. An apparatus as claimed in claim 1, wherein the first and second pole portions are arranged to form a symmetric dipole reception antenna.

9. An apparatus as claimed in claim 1, wherein the common-mode filter has a common-mode impedance of between about 1000Ω and about 4000Ω.

10. An apparatus as claimed in claim 9, wherein the common-mode filter has a common mode impedance of about 2200Ω.

11. An apparatus as claimed in claim 1, further comprising an amplifier coupled in line between the proximal end of the length of coaxial cable and the first and second pole portions.

12. An apparatus as claimed in claim 11, wherein the amplifier is coupled between the common-mode filter and the first and second pole portions.

13. An apparatus as claimed in claim 11, wherein the amplifier is coupled between the proximal end of the length of coaxial cable and the common-mode filter.

14. A reception apparatus comprising:

the antenna arrangement apparatus as claimed in claim 1; and a tuner coupled to a distal end of the length of coaxial cable.

15. An apparatus as claimed in claim 14, wherein the tuner is a Frequency Modulation (FM) tuner.

16. An apparatus as claimed in claim 14, wherein the tuner is a Radio Data System (RDS)-Traffic Message Channel (TMC) tuner.

17. An apparatus as claimed in claim 14, further comprising a coupling cable for communicating data decoded by the tuner to a device.

18. A portable navigation device comprising the reception apparatus as claimed in claim 14.

19. A portable navigation device comprising the antenna arrangement apparatus as claimed in claim 1.

* * * * *